United States Patent [19]
Wood et al.

[11] Patent Number: 5,146,749
[45] Date of Patent: Sep. 15, 1992

[54] BALANCING TECHNIQUE FOR ROSS-TYPE STIRLING AND OTHER MACHINES

[76] Inventors: James G. Wood, 3996 Marion Johnson Rd., Albany, Ohio 45710; Melvin A. Ross, 8169 Lake Bluff Ct., Columbus, Ohio 43235

[21] Appl. No.: 684,863

[22] Filed: Apr. 15, 1991

[51] Int. Cl.$^5$ ............................................. F02G 1/053
[52] U.S. Cl. ........................................ 60/517; 74/44; 74/45
[58] Field of Search .................. 60/517, 525, 526; 74/44, 45

[56] References Cited

U.S. PATENT DOCUMENTS

| | | | |
|---|---|---|---|
| 4,138,897 | 2/1979 | Ross | 74/44 X |
| 4,532,819 | 8/1985 | Ross | 60/525 X |
| 4,546,663 | 10/1985 | Ross et al. | 74/44 |
| 4,738,105 | 4/1988 | Ross et al. | 60/517 |

Primary Examiner—Allen M. Ostrager
Attorney, Agent, or Firm—Frank H. Foster

[57] ABSTRACT

An improved technique for balancing inertia forces and rocking couples of a Ross-type Stirling machine (U.S. Pat. Nos. 4,138,897; 4,532,819 and 4,738,105). Two counter-rotating balance masses are used, one on the crankshaft and one on a separate balance shaft. These balance masses lead the throw of the crankshaft by more than 180 degrees of rotation. The axis of the balance shaft is positioned so that a line connecting it and the axis of the crankshaft is inclined with respect to the cylinder axes toward the heavier piston of the machine. The new technique is also applicable to other machines having separate parallel cylinders in which pistons of unequal mass reciprocate out of phase.

5 Claims, 1 Drawing Sheet

BALANCING TECHNIQUE FOR ROSS-TYPE STIRLING AND OTHER MACHINES

TECHNICAL FIELD OF THE INVENTION

This invention relates generally to a balancing technique for parallel cylinder machines having pistons of unequal masses reciprocating with a phase difference, and more particularly relates to such a balancing technique which is most advantageously used in Stirling machines, particularly of the Ross-type.

BACKGROUND

The Ross-type of Stirling cycle machine is a well known type of kinematic (mechanically constrained motion) Stirling cycle machine. The Ross machine is commonly considered for numerous applications ranging from stationary ground-based applications to cryocooling of infrared sensors for use in outer space missions. The advantages of the Ross-type machine is that it has a mechanically simple mechanism which provides for the correct phase relationship of the piston motions for the Stirling cycle, while at the same time nearly eliminating piston side loads.

The avoidance of piston side loads reduces frictional losses and increases the life of the cylinder sliding surfaces. This is particularly important in allowing for the use of a dry sump where the crankcase does not contain an oil reservoir. With low piston side loads, teflon-based sliding surfaces can be used in the cylinders, and mechanism pivots can consist of sealed permanently-lubricated bearings. The dry sump avoids the possibility of oil entering the working space and contaminating the heat exchangers, and in the case of an air engine avoids the dangerous possibility of an explosion should oil reach the hot parts of the engine. A typical drawing of a Ross-type machine, incorporating the new balance technique, is shown in FIG. 1. The basic arrangement of the Ross-type machine utilizes separate parallel cylinders and a single throw crankshaft. The throw of the crankshaft is pivotally connected to a yoke.

Two additional pivotal connections exist on the yoke for connections to the piston driving links. A fourth pivotal connection on the yoke connects to a swinglink, the other end of said swinglink being pivotally connected to the block of the engine. Piston side loads are small because the connections on the yoke which drive the pistons approximate straight line motions.

The prior art for balancing of the Ross machine presented two options.

The first and simpler of the two, utilized a single counter-rotating balance shaft placed directly above the crankshaft of the engine. Both this balance shaft and the engine crankshaft contained balance masses positioned to lead the throw of the crankshaft by 180 degrees of rotation.

This method however required that the piston masses be made equal and also placed geometrical restrictions on the design of the mechanism.

The second prior art balancing scheme did not have the restrictions of the method described above, but required two balance shafts Because of the complication of the second balance shaft, and the fact that its inclusion also increased the mass of the machine, this second method was seldom utilized in practice.

The requirement for equal piston masses in the first mentioned balance method added additional mass to the machine. The form of the two pistons of a Stirling machine is not the same. As is seen in FIG. 1, the expansion piston 12 is more complicated than the compression piston 15, primarily because it uses a Heylandt crown 13.

The purpose of the Heylandt crown is to isolate the extreme temperature of the expansion space gas (hot gas in the case of an engine) from that of the expansion space piston seal 16. The compression piston 15 does not need a Heylandt crown and thus can be lighter than the expansion piston.

Also, because the drive point 17 on the yoke approximates straight line motion, the compression piston 15 is often constructed as shown in FIG. 1 without the wrist pin and bearing 18 used on the expansion piston.

In this case the compression piston will rock slightly during its up and down travel due to the small lateral movements of the drive point 17. The absence of the wrist pin and bearing on the compression piston also leads to the compression piston being lighter than the expansion piston.

It is sometimes possible to eliminate the expansion piston wrist pin 18, but this is less common in practice because the gap between the Heylandt crown and the cylinder would have to be enlarged to allow for rocking of the expansion piston. Enlarging this gap is often detrimental to engine performance because it increases the unswept volume of the working space and leads to increased heat transfer losses in the gap.

Thus, the mass of the compression piston can be made considerably lighter than that of the expansion piston. However, the prior art for balancing utilizing a single balance shaft required that the mass of compression piston be artificially increased to match that of the expansion piston. Also, the mass increase to the machine was not limited to that associated with the added piston mass. Many other factors resulting from the added piston mass contributed to added machine mass and cost.

The added piston mass increased the required balance forces which was often accomplished with heavier counterweights. Also many mechanism loads as well as the transmission loads between the crankshaft and balance shaft increased. This required the use of larger bearings and stronger parts which also added to the weight and cost of the machine.

This prior art balancing technique also placed restrictions on the mechanism geometry. This restriction was that the horizontal yoke arm lengths between the swinglink pivot and the piston driving points must be equal. This limited the freedom of the designer to select the most ideal arm lengths for the given machine layout.

OBJECTS AND ADVANTAGES OF THE INVENTION

Accordingly the objects and advantages of our invention are to provide a simple balancing technique for Ross-type Stirling machines While at the same time not adding undue mass and cost to the engine, nor unduly restricting the design geometry of the mechanism.

With the invention described here, it is not necessary to artificially increase the mass of the lighter piston. A further advantage which leads to a lighter balanced machine is that the required counterbalance masses are smaller than those used in the previous art.

The lighter swung masses of the invention also reduce inertia loadings in the mechanism as well as transmission loads between the crankshaft and the counterbalance shaft. These lighter loads allow the use of lighter parts and smaller bearings which also lead to a lighter machine and reduced cost.

An additional advantage of the invention described here is that greater freedom is allowed to the designer as to the selection of the geometry of the mechanism.

BRIEF SUMMARY OF THE INVENTION

This invention is an improved method of balancing for Ross-type Stirling machines and other machines having parallel, or nearly parallel, separate cylinders in which pistons reciprocate with a phase difference.

For the Ross-type arrangement a counterweight is attached to the crankshaft of the machine positioned so as to lead the crankthrow motion by an angle in excess of 180 degrees.

A single counter-rotating balance shaft whose axis is parallel to the crankshaft of the engine is also provided which contains a balance mass.

This balance shaft is placed toward the heavier of the two pistons of the engine. The second balance mass is sized and positioned on the balance shaft so that its inertia force during rotation, combined with the inertia force of the balance weight on the crankshaft, serve to cancel out primary forces and rocking couples caused by the reciprocation of the engine pistons.

Figure 1:
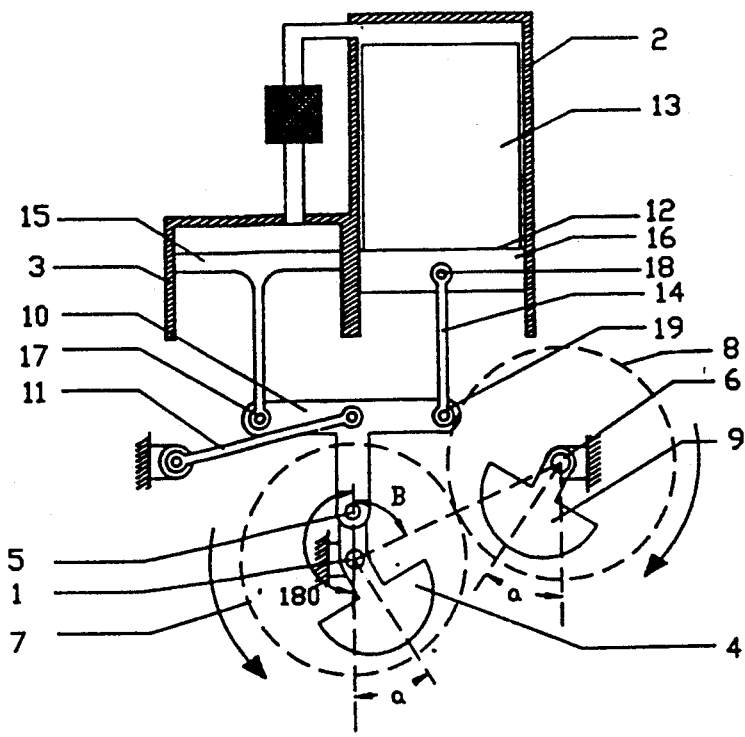
FIG. 1 is a diagram illustrating the connection of an embodiment of the invention to a Ross-type Stirling machine.

In describing the preferred embodiment of the invention which is illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose.

DESCRIPTION OF THE INVENTION

The preferred embodiment of the invention as applied to a Ross-type machine is shown in FIG. 1 In the Ross-type machine a single crankshaft 1 causes two pistons 15 and 16 to reciprocate out of phase in separate parallel, or nearly parallel, cylinders 2 and 3. The crankshaft 1 of the illustrated engine rotates in a counter-clockwise direction. However, those knowledgeable in the art will realize that the direction of rotation can easily be reversed in which case the expansion cylinder 2 and compression cylinder 3 will trade places.

The invention is also applicable to other machines in which pistons of different masses reciprocate with a phase difference in separate parallel or nearly parallel cylinders. The invention is most advantageously used when applied to a mechanism which accomplishes this motion with a single crankshaft, such as the Ross-type machine.

In the new invention, as applied to a Ross machine as shown in FIG. 1, a counterbalance mass 4 is attached to the crankshaft 1. This counterbalance mass is located at an angle 180 degrees plus a in the direction of crankshaft rotation ahead of the crankthrow 5. Angle a is ordinarily less than 90°. The desired mass of the counterbalance and its effective radial distance from the crankshaft axis will be given by equations presented later.

Those knowledgeable in the art of balancing will realize that it is also desirable to include on the crankshaft 1 a balance mass opposite the crankthrow 5 to balance the equivalent mass moving with the crankthrow.

This is also desirable with the invention described here but for the sake of clarity will be omitted from the description which follows. In practice it will be desirable and an easy task to also include such balancing in addition to that of the invention described here.

A single counter-rotating balance shaft 6 is provided, the axis of which is parallel to the crankshaft axis. This balance shaft is placed so that a line in the plane of the figure which connects the axes of this shaft 6 and the crankshaft 1 forms an angle B with the vertical or, if the machine is not vertically oriented, with a plane through the axis of rotation of the crankshaft and parallel to the axes of reciprocation of the pistons. This is a noticeable difference from the previous art where the balance shaft was located directly above the crankshaft. It will later be seen that this angle B is inclined in the direction of the heavier of the two pistons of the engine.

The balance shaft 6 rotates in the opposite direction and at the same speed as the crankshaft of the engine. This can be accomplished by any of the known engineering means of providing this motion such as equal diameter meshing gears 7 and 8 one each attached to the crankshaft 1 and the balance shaft 6.

The balance shaft 6 also contains a balance weight 9. The rotational position of the balance weight of the balance shaft is also placed at an angle a as shown in the figure. Here the sense of a is such that both counterbalance masses are at the extremes of their vertical positions at the same instant of time. In the figure the crankthrow 5 is shown at TDC (top dead center) at this time both counterbalance masses passed through their downward extremes of motion a degrees of rotational motion prior to this instant.

It will be noticed that the phase lead a of both counterbalance masses is also different from that of the prior art. In the prior art the angle a as defined here was equal to zero, so that the counterbalance weight on the crankshaft was directly opposite of the crankthrow.

Figure 2:
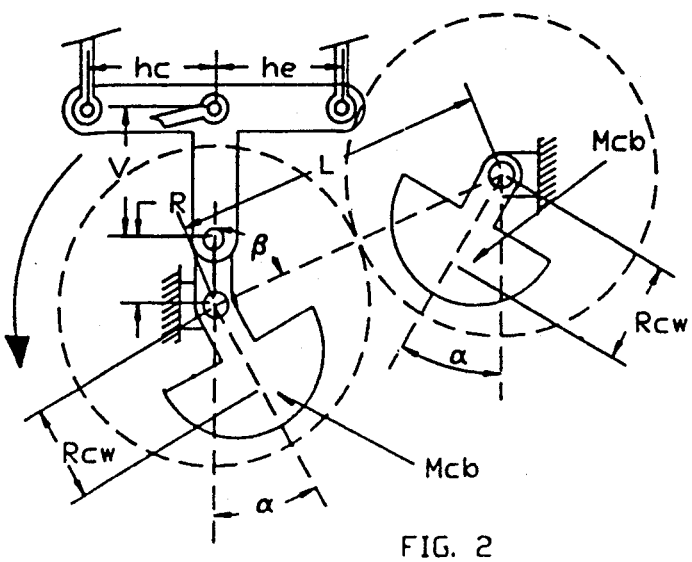
FIG. 2 is a diagram illustrating the geometrical parameters used to describe the balance technique.

In FIG. 2 are presented geometrical dimensions describing an embodiment of the invention applied to the Ross-type machine. The following equations define the preferred embodiment of the balance technique as applied to such an engine.

The equations are:

$$a = \tan^{-1}[F(1 - Q_h Q_m)/(1 + Q_m)]$$
$$b = \tan^{-1}[F(1 + Q_h^2 Q_m)/(1 - Q_h Q_m)]$$
$$B = 90° + a - b$$
$$M_{cb} = [rm_e/(2R_{cw})][(1 + Q_m)^2 + F^2(Q_m Q_h - 1)^2]^{\frac{1}{2}}$$
$$L = [rm_e h_e/(R_{cw} M_{cb})][(Q_h Q_m - 1)^2 + F^2(1 + Q_h^2 Q_m)^2]^{\frac{1}{2}}$$

where
$Q_h = h_c/h_e$
$Q_m = m_c/m_e$
$F = h_e/v$
and
    a is the phase lead of the counter weights ahead of the position opposite the crankthrow
    B is the angle by which the balance shaft is positioned toward the expansion piston
    $M_{cb}$ is the counterbalance mass
    L is the spacing between the crankshaft and the balance shaft $m_e$ is the reciprocating mass associated with the expansion piston $m_c$ is the reciprocating mass associated with the compression piston r is the crankthrow $h_e$ is the yoke arm length from the swinglink pivot to the pivot which drives the expansion piston $h_c$ is the yoke arm length from the swinglink pivot to the pivot which drives the compression piston v is the yoke arm length from the swinglink pivot to the pivot with the crankthrow $R_{cw}$ is the effective radius describing the position of the counterbalance mass with respect to its axis of rotation.

Those knowledgeable in the art of balance will realize that the effective masses $x_e$ and $m_c$ are intended to include all mass which can be assumed to be located at the drive points 19 and 18 respectively. In practice this will include not only the mass of the pistons but also the appropriate part of the masses of the yoke 10, the swinglink 11, the pivots, and associated connecting links such as 14.

While it is preferred that the counterweight masses $M_{cb}$ be equal and that the radial eccentric offset $R_{cw}$ of their centers of mass be equal, it is only necessary that the product of the mass and radial offset of one be equal to the product of the mass and radial offset of the other.

Additionally, it is known to those skilled in the art that multiple counterbalance weights may be attached to a rotating shaft to counterbalance differing reciprocating and rotating inertia forces. It is also known that the compensating forces from multiple counterbalance weights can be replaced by a resultant counterbalance weight This can be accomplished in accordance with conventional vector analysis principles. For example, two weights, each having a center of mass at a different angular and radial positions can be replaced by a single weight at an intermediate angle and position.

These principles can be applied to the present invention. For example, a conventional crank pin counterbalance weight can be combined with a counterbalance weight of the present invention and instead a resultant weight used which provides the necessary components for both conventional crank pin balancing and the balancing in accordance with the present invention. Consequently, the counterbalance weight called for in accordance with the invention can be a component of a resultant or composite mass.

We claim:

1. An apparatus for balancing inertia forces and rocking couples resulting from the approximately parallel reciprocation of a pair of unequal piston masses linked to a crankshaft and reciprocating out of phase, the apparatus comprising:
    (a) a first counter balance weight mounted to the crankshaft eccentrically of the crankshaft axis of rotation and at an angle which leads the crank throw by a lead angle of more than 180°;
    (b) a balance shaft mounted for rotation about an axis parallel to the crankshaft axis and drivingly coupled to the crankshaft for rotation in a direction opposite to the crankshaft rotation and at the same angular velocity, the balance shaft axis being offset and spaced from a plane extending through the crankshaft axis and oriented substantially parallel to the axes of reciprocation of the piston masses, said balance shaft being positioned on a radial of the crankshaft axis on the same side of the plane as the greater piston mass; and
    (c) a second counter balance weight mounted eccentrically to the balance shaft and having the product of its mass multiplied by the radial, eccentric offset of its center of mass equal to the product of the first counterbalance weight multiplied by the radial eccentric offset of its center of mass and positioned to lead the crank throw by said lead angle of the first counterbalance mass.

2. An apparatus in accordance with claim 1 wherein said balance shaft is spaced from said plane by a distance selected such that the resultant inertia force of the two pistons acts along a line which bisects a line joining the axes of rotation of the crank shaft and the balance shaft.

3. An apparatus in accordance with claim 2 wherein said lead angle and the angle between said plane and said radial are selected to counterbalance the rocking couples.

4. An apparatus for balancing inertia forces and rocking couples resulting from the approximately parallel reciprocation of an expansion piston and a compression piston in a Ross-type Stirling machine in which a yoke is pivotally connected to the throw of a crankshaft, pivotally connected to a swinglink and has a pair of arms, one of which is pivotally linked to each piston, the apparatus comprising:
    (a) a first counter balance weight mounted to the crankshaft eccentrically of the crankshaft axis of rotation and at an angle which leads the crank throw by a lead angle of more than 180°;
    (b) a balance shaft mounted for rotation about an axis parallel to the crankshaft axis and drivingly coupled to the crankshaft for rotation in a direction opposite to the crankshaft rotation and at the same angular velocity, the balance shaft axis being offset and spaced from a plane extending through the crankshaft axis and oriented substantially parallel to the axes of reciprocation of the piston masses, said balance shaft being positioned on a radial of the crankshaft axis on the same side of the plane as the greater piston mass; and
    (c) a second counter balance weight mounted eccentrically to the balance shaft and having the product of its mass multiplied by the radial, eccentric offset of its center of mass equal to the product of the first counterbalance weight multiplied by the radial eccentric offset of its center of mass and positioned to lead the crank throw by said lead angle of the first counterbalance mass.

5. An apparatus in accordance with claim 4 wherein:

$$a = \text{Tan}^{-1}[F(1 - Q_h Q_m)/(1 + Q_m)]$$
$$b = \text{Tan}^{-1}[F(1 + Q_h^2 Q_m)/(1 - Q_h Q_m)]$$
$$B = 90° + a - b$$

where $Q_h = h_c/h_e$ $Q_m = m_c/m_e$ $F = h_e/v$ and a is the phase lead of the counter weights ahead of the position opposite the crankthrow B is the angle by which the balance shaft is positioned toward the expansion piston $M_{cb}$ is the counterbalance mass L is the spacing between the crankshaft and the balance shaft $m_e$ is the reciprocating mass associated with the expansion piston $m_c$ is the reciprocating mass associated with the compression piston r is the crankthrow $h_e$ is the yoke arm length from the swinglink pivot to the pivot which drives the expansion piston $h_c$ is the yoke arm length from the swinglink pivot to the pivot which drives the compression piston v is the yoke arm length from the swinglink pivot to the pivot with the crankthrow $R_{cw}$ is the effective radius describing the position of the counterbalance mass with respect to its axis of rotation.

* * * * *